United States Patent
Strange (10) Patent No.: US 7,258,223 B2
(45) Date of Patent: Aug. 21, 2007

(54) PALLET CONVEYOR WITH CHAIN DRIVE RECIRCULATING IN A HORIZONTAL PLANE

(75) Inventor: David M. Strange, Lansing, MI (US)

(73) Assignee: Roberts-Sinto Corporation, Lansing, MI (US)

( * ) Notice: Subject to any disclaimer, the term of this patent is extended or adjusted under 35 U.S.C. 154(b) by 233 days.

(21) Appl. No.: 10/962,366

(22) Filed: Oct. 8, 2004

(65) Prior Publication Data

US 2005/0247546 A1 Nov. 10, 2005

Related U.S. Application Data

(60) Provisional application No. 60/568,938, filed on May 6, 2004.

(51) Int. Cl.
*B65G 17/02* (2006.01)
(52) U.S. Cl. .................................... 198/465.2; 198/799
(58) Field of Classification Search ............. 198/465.1, 198/797, 799, 800, 834, 838, 867.13, 867.15
See application file for complete search history.

(56) References Cited

U.S. PATENT DOCUMENTS

| | | | |
|---|---|---|---|
| 3,297,139 A | 1/1967 | Speigle | |
| 3,805,942 A | 4/1974 | Auernhammer | |
| 3,934,701 A | 1/1976 | Mooney et al. | |
| 3,949,859 A | 4/1976 | Nussbaumer et al. | |
| 4,088,220 A | 5/1978 | Jacksch et al. | |
| 4,139,092 A * | 2/1979 | Yamano | 198/800 |
| 4,201,286 A | 5/1980 | Meier | |
| 4,299,269 A * | 11/1981 | Friesen et al. | 164/324 |
| 4,331,229 A | 5/1982 | Kamm | |
| 4,431,102 A | 2/1984 | Bittner | |
| 4,442,935 A | 4/1984 | Gregg | |
| 4,712,670 A | 12/1987 | Burkhardt | |
| 4,722,433 A * | 2/1988 | Gough | 198/706 |
| 4,751,998 A | 6/1988 | Yano | |
| 4,757,893 A | 7/1988 | Shabram et al. | |

(Continued)

*Primary Examiner*—Douglas Hess
(74) *Attorney, Agent, or Firm*—John R. Benefiel (57) ABSTRACT

A conveyor using a drive chain to drive pallets along a closed loop path on a track lying in a horizontal plane through inside and outside turns so that the conveyor may transport parts along non aligned stations. An advance and a return run extend parallel to each other and are closely spaced to minimize the floor space required. The drive chain is engaged by two spaced apart sprockets engaging a respective side of the drive chain, the sprockets mounted to the pallet on a pivoted bar spring biased to urge the sprocket teeth into engagement with the chain. The sprocket bar is pivotally mounted to one end of the swing bar which has an opposite end connected to the pallet to allow the chain and pallet to move together along the track and negotiate inside and outside turns. The chain is guided in a chain guide channel through inside turns, and on sprockets around the outside turns. A pair of friction brake rollers are included, each attached to one of the sprockets and are normally in firm contact with each other to brake the sprockets and carry the pallet along with the chain, which friction brake rollers slip when the pallet is arrested by a stop mechanism to be allowed to accumulate, the sprockets then able to rotate and the chain allowed to continue to circulate past the stopped pallet.

25 Claims, 11 Drawing Sheets

U.S. PATENT DOCUMENTS

| | | |
|---|---|---|
| 4,776,452 A | 10/1988 | Burkhardt |
| 4,776,453 A | 10/1988 | Miller |
| 4,934,515 A | 6/1990 | Linden |
| 4,947,978 A * | 8/1990 | Rhodes ................. 198/341.02 |
| 4,987,992 A * | 1/1991 | Pfleger ................... 198/475.1 |
| 5,088,589 A * | 2/1992 | Geerts .................. 198/457.05 |
| 5,282,529 A | 2/1994 | Schwammle |
| 5,313,048 A | 5/1994 | Berg et al. |
| 5,407,058 A * | 4/1995 | Gyger ..................... 198/465.3 |
| 5,595,545 A | 1/1997 | O'Brien |
| 5,735,384 A * | 4/1998 | Lingo et al. ............. 198/465.1 |
| 6,019,214 A | 2/2000 | Herronen et al. |
| 6,341,687 B1 * | 1/2002 | Cattaruzzi ................... 198/802 |
| 6,394,260 B1 * | 5/2002 | Barth et al. .................. 198/799 |
| 6,415,906 B2 | 7/2002 | Bethke et al. |
| 6,464,066 B2 * | 10/2002 | Bethke et al. ........... 198/465.1 |
| 6,568,525 B2 | 5/2003 | Stone et al. |
| 6,675,950 B1 * | 1/2004 | Collon .................... 198/465.2 |
| 6,907,983 B2 * | 6/2005 | Freudelsperger et al. ..................... 198/468.01 |

* cited by examiner

PALLET CONVEYOR WITH CHAIN DRIVE RECIRCULATING IN A HORIZONTAL PLANE

CROSS REFERENCE TO RELATED APPLICATIONS

This application claims the benefit of U.S. provisional Ser. No. 60/568,938, filed May 6, 2004.

BACKGROUND OF THE INVENTION

This invention concerns conveyors, and more particularly conveyors in which a series of pallets are driven around a closed loop track by a recirculating link chain, parts to be conveyed thereby being carried by the pallets. Such conveyors are commonly used in moving parts through a series of workstations where processes are performed on the parts.

Conveyors are sometimes designed as "accumulator" or asynchronous conveyors, allowing pallets to form a queue at one or more stations by disengaging the drive connection of the pallets to the drive chain so that the drive chain can overrun the queued pallets. Conveyors are also designed to the "synchronous", in which the pallets always remain in driving engagement with the drive chain and always move in synchronism with the chain.

Many such conveyors arrange the chain to recirculate through a path lying in a vertical plane in which the drive chain has an upper segment along which the parts are advanced, and a return segment lying below the upper segment with end sprockets at either end rotating about a horizontal axis. See U.S. Pat. Nos. 4,757,893 and 5,735,384 for examples of such conveyors.

In another form, the drive chain recirculates along a closed loop path lying in a horizontal plane, which has the advantage of allowing the parts to remain on the pallets through the entire path of the chain recirculation, increasing the number of stations possible, improving the versatility of the conveyor, and enhancing the processing and handling efficiency of the parts.

The parts are usually mounted on an upper horizontal surface on the pallet, but longer parts are sometimes better handled by being vertically suspended thereon.

For that reason, chain conveyors have been devised in which the chain recirculates along a path lying in a horizontal plane and a part can be hung on the side of pallets driven by the chain.

This arrangement is shown in U.S. Pat. Nos. 6,019,214; 6,568,525 and 3,785,475.

In those arrangements, the chain (or a friction band) circulates along a path having only outside turns, as shown in U.S. Pat. No. 6,568,525. Since the return segment can only undergo outside turns, this necessitates an open space between the advance and return conveyor runs if the conveyor routing deviates from a simple straight line, i.e., if one or more of the stations are not aligned. This creates wasted space between advance and return runs of the conveyor which wasted space is a significant disadvantage when installed in the confines of a typical manufacturing facility. It may be desirable for the conveyor to be routed to such a station at such a particular location.

It would be advantageous to be able to route the drive chain and pallets through a path which could include inside turns as the conveyor could be routed to any desired station location while maintaining the advance and return conveyor runs closely spaced to be able to locate various stations anywhere with minimal use of floor space.

In an accumulating conveyor, the need to controllably disengage the pallet from the conveyor drive chain has typically involved complex latching mechanisms which are subject to failure and are costly to fabricate.

It is an object of the present invention to provide a conveyor which includes a pallet drive chain which circulates along a closed loop path lying in a horizontal plane which is able to move pallets around both inside and outside turns for achieving maximum flexibility in locating stations and minimal use of floor space.

It is another object to provide a simplified and reliable arrangement for selectively engaging and disengaging pallets with the conveyor chain while being able to be routed through inside and outside turns.

It is another object to provide a pallet conveyor which can mount parts in either a horizontal on top of the pallets or a vertical orientation on the side of the pallet.

SUMMARY OF THE INVENTION

The above objects as well as other objects which will be understood upon a reading of the following specification and claims are accomplished by a conveyor moving pallets along a route which includes both inside and outside turns so that the advance and return conveyor segments can be substantially evenly spaced apart even if the stations are not arranged along a straight line. The inside turns are enabled by guiding a multistrand link drive chain edgewise in straight and curved guide rails formed with a recess receiving one or more of the strands while allowing a strand to protrude above the guide rail. A series of sprockets guide the chain around outside turns at the ends of the conveyor where the conveyor change reverses direction and at intermediate turns, the outside turns defined by the sprockets, and the inside turns by curved guide sections.

The drive chain drivingly engages a plurality of pallets supported on a track extending along the conveyor path but disposed above the drive chain. Each pallet is configured with a horizontal top part mounting plate at the top and vertical part mounting side plate positioned along side the track and drive chain, allowing parts to be mounted horizontally on the top plate or vertically on the side plate of each pallet.

The pallets are supported on and guided along the track by a pair of pivoted roller assemblies, each assembly having a support roller rotatable about a horizontal axis, and three guide rollers rotatable about a vertical axis and straddling the track, the pivotal mounting accommodating straight and inside and outside curved sections as the pallet rolls along the track.

The driving engagement of the pallet with the drive chain is established through a swing bar pivoted to a horizontal plate projecting inwardly from the side plate of the pallet at the height of the drive chain. The pivoting of the swing bar accommodates the changing orientation of the pallet as it negotiates inside or outside curves along the drive chain path.

To provide an accumulator capability while allowing inside turns, the drive chain is drivingly engaged by a pair of closely spaced apart sprockets straddling the drive chain, each having sprocket teeth engaging one side of the drive chain. The sprockets are each rotatably mounted on respective rotary support, both of which are in turn mounted side by side on a sprocket bar pivoted at its midpoint on the swing bar. The sprocket bar is spring urged to rotate on the swing bar to bring the teeth of each sprocket into engagement with chain openings from a respective side of the drive chain.

A friction brake roller is rotationally fixed with respect in each brake roller firmly frictionally engaged with each other to normally prevent rotation of either sprocket since the roller tends to rotate in opposite directions from each other.

This causes the sprockets to be carried along with the chain since the teeth of each sprocket are engaged with link chain openings side from each of the drive chain. Since the sprockets are connected to the associated pallet through the connection with the swing bar, this movement also carries the associated pallet along with the drive chain.

The swing bar pivotal mounting and the double sprocket chain engagement allows an accommodation to the changing orientation of the pallet with the chain when the pallet negotiates either inside or outside turns, allowing the conveyor to be routed to any station locations while keeping the advance and return runs parallel and together, eliminating the wasted space between the advance and return runs thereof as occurred in prior designs.

When a stop located along the conveyor runs is selectively operated to arrest movement of a pallet, the friction rollers slip against each other to be allowed to rotate so that the connected sprockets are allowed to rotate, and the drive chain thereby can overrun the stopped pallet.

Each of the pallets has radiused bumpers at each end contacted at the changing angles of the pallets at the inside or outside turns in a synchronous version of the conveyor, the free end of the swing bar is directly drivingly engaged with the chain by drive pins fixed to the drive chain pivotable in a bore in the end of the swing bar.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
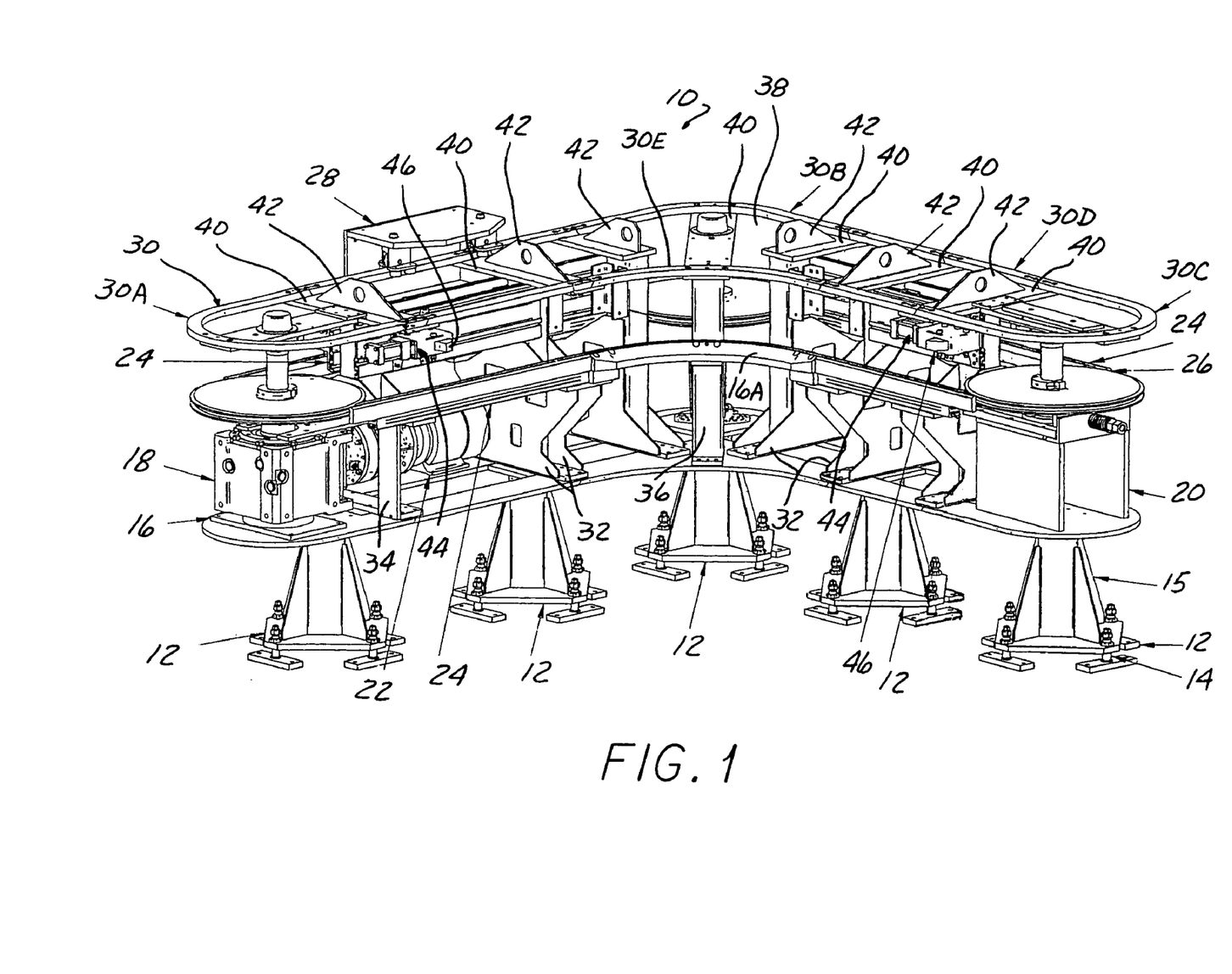
FIG. 1 is a pictorial view of a conveyor according to the present invention of an accumulating type, with the drive chain removed and only a single pallet installed therein for clarity.
Figures 1A, 2:
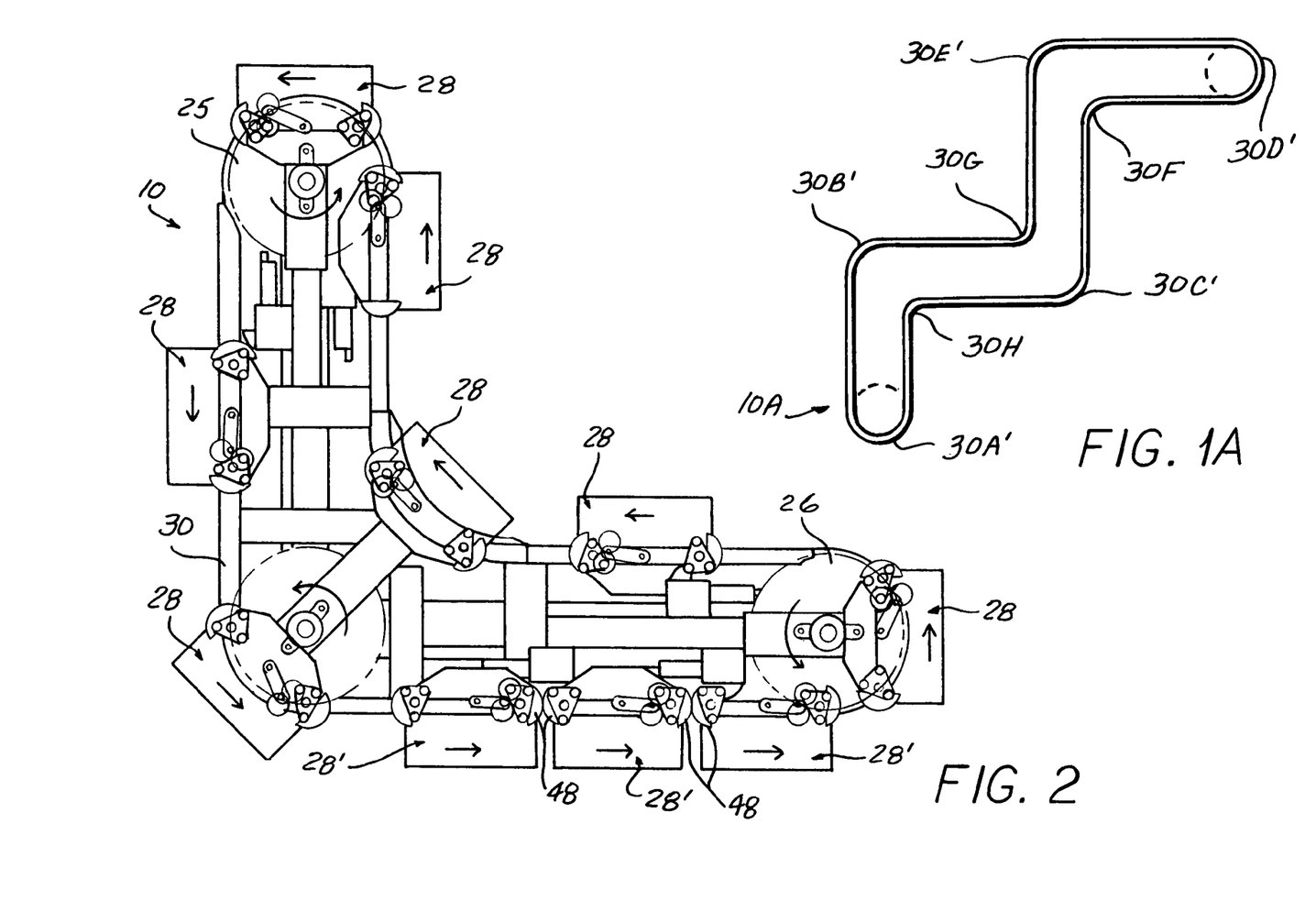
FIG. 1A is a diagram of another possible conveyor configuration.
FIG. 2 is a plan view of the conveyor shown in FIG. 1.
Figure 3:
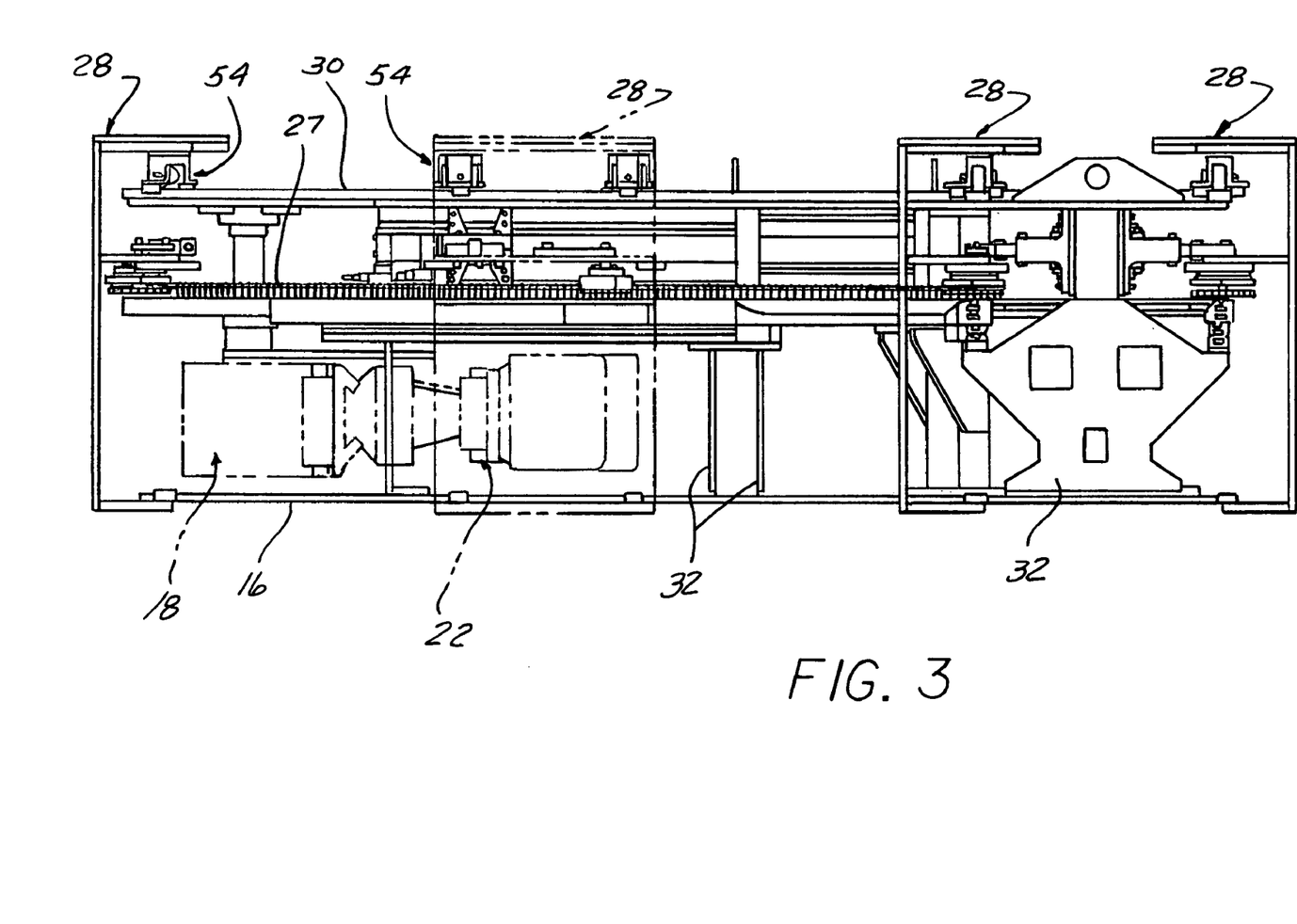
FIG. 3 is an elevational view of the upper part of the conveyor shown in FIG. 1.

Referring to the drawings and particularly FIGS. 1–3, a conveyor 10 according to the invention is supported above the floor on a series of stanchion assemblies 12, including a series of leveling screws 14 and a gusset-tube weldment 15.

A support-guide plate 16 is attached to the stanchions assemblies 12, and holds a sprocket drive unit 18 at one end and an idler-tensioner sprocket unit 20 at the other end of the conveyor 10. A drive motor 22 is included in the sprocket drive unit 18, a chain drive sprocket 25 thereby rotated to advance a multi strand link drive chain 27 (FIGS. 3, 4, not shown in FIG. 1) along chain guide channels 24 and around an idler sprocket 26 at the other end of the conveyor 10.

A series of pallets 28 (only one shown for the sake of clarity) are supported on a track 30 having outwardly curved turn sections 30A, 30C, at either end of the conveyor 10, an intermediate outside turn 30B, straight sections 30D, as well as an inwardly curved inside turn section 30E located across from the intermediate outside turn 30C. These sections form a closed loop path lying in a horizontal plane along which the pallets 28 are driven as will be described herein in detail. The conveyor 10 thus can have segments extending at an angle with respect to each other to allow routing of the conveyor to a non aligned work station without creating wasted space between the advance and return runs of the conveyor 10. The conveyor 10 shown has angularly related segments lying at right angles to each other.

Many other configurations are made possible, as the conveyor 10A shown in FIG. 1A, where a plurality of inside turns 30B', 30G, 30G are included, with outside turns 30A', 30B', 30C', 30D', 30E'. This creates a series of conveyor segments with parallel advance and return runs to minimize wasted space, providing great flexibility in locating stations along the conveyor. This illustrates that conveyors according to the invention can be routed to any particular location without wasting floor space.

The track 30 has an outline following the outer edge of the support-guide plate 16 and assisting in guidance of the pallet 28 in its movement along the track 30 as will be described. The advance and return runs are allowed to remain parallel and closely spaced by the presence of the inside turn section 30E.

The drive chain guide channels 24 are supported on various web pieces 32, plates 34, and members 36 affixed to the bottom guide plate 16, which also support the various sections of the track 30.

An outside turn idler sprocket 38 guides the drive chain 27 (shown in FIGS. 3 and 4 but not shown in FIG. 1 for the sake of clarity) around the intermediate outside corner creating the angularly configured conveyor. A curved chain guide channel section 16A guides the drive chain around the inside turn as shown.

Upper brace plates 40 support the sprocket shafts and brace the track 30. Lifting eyes 42 can also be provided.

Controllably activated stop mechanisms 44 are provided able to controllably project a stop finger 46 into the path of the pallets 28 so as to engage a stop block 118 (FIGS. 5A, 5B) on each pallet 28 when pallet accumulation is to occur, as will be described in further detail below.

Accumulation of pallets 28 is shown on the right in FIG. 2 in which the pallets 28' are queued up, with the radiused bumpers 48 on adjacent pallets 28' in contact with each other.

Figure 4:
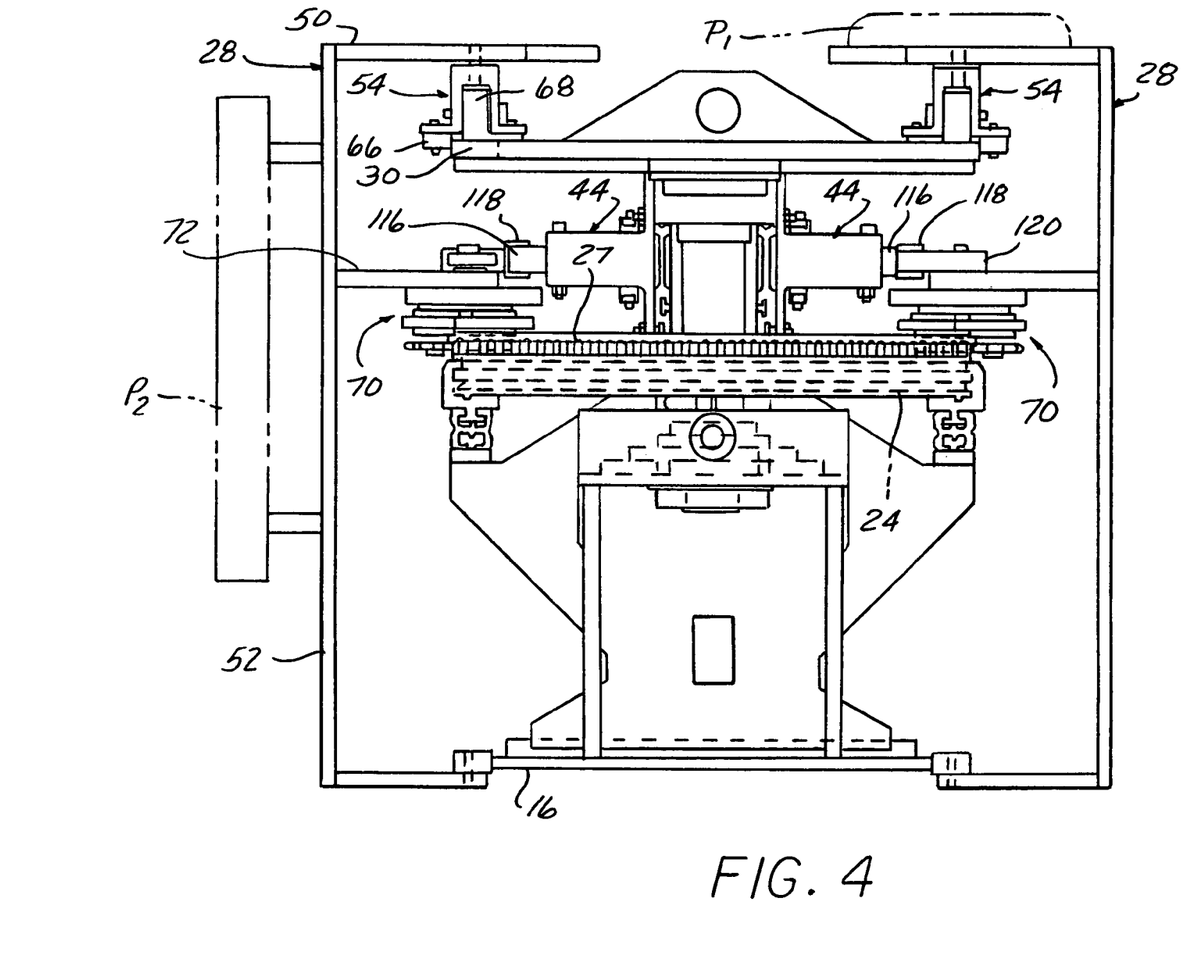
FIG. 4 is a view of a transverse section taken through the upper part of the conveyor of FIG. 1.
Figure 5A:
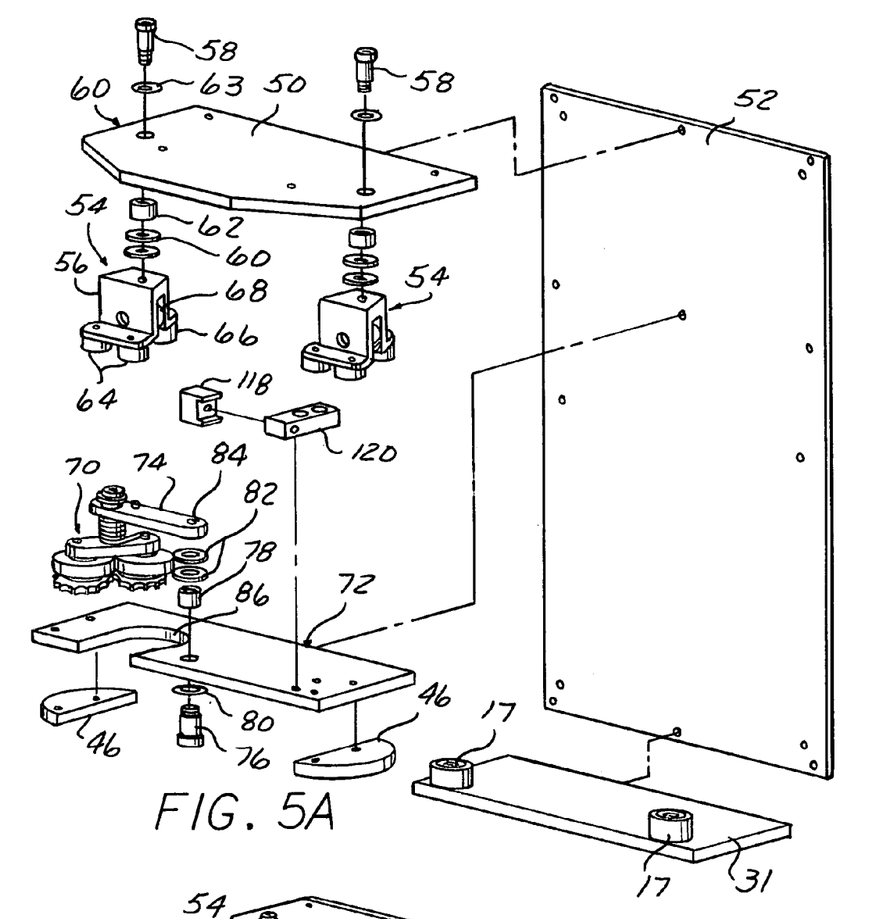
FIG. 5A is a pictorial view of a pallet included in the conveyor shown in FIG. 1.
Figure 5B:
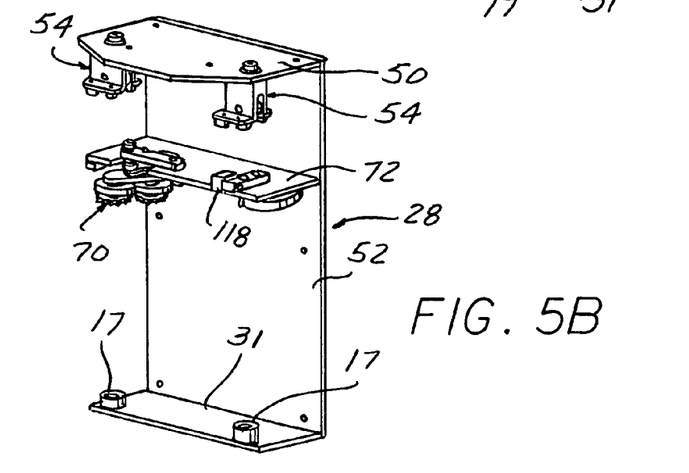
FIG. 5B is an exploded pictorial view of the components included in the pallet shown in FIG. 5A.

As seen in FIG. 4 and FIGS. 5A and 5B, each pallet 28 has a horizontal part mounting plate 50 and a vertical part mounting plate 52 connected thereto providing alternate mounting surfaces as for different types of parts $P_1$, $P_2$.

The top plate 50 is cantilevered inwardly over the track 30 and has a pair of cam roller assemblies 54 pivoted to the underside thereof. Each cam roller assembly 54 includes a slotted block 56 pivotally mounting on the plate 50 by a shoulder bolt 58 received in a threaded hole in the slotted block 50, thrust washers 60, as well as thrust bearing 63, and a bushing 60.

Two cam rollers 64 are mounted on one side of a slot in the block 56 and a single cam roller 66 on the other side, each rotatable about a vertical axis to engage the side edges of the track 30.

A single larger diameter cam roller 68 is mounted for rotation about a horizontal axis so as to support the weight of the pallet 28 on the track upper surface.

Figure 9A:
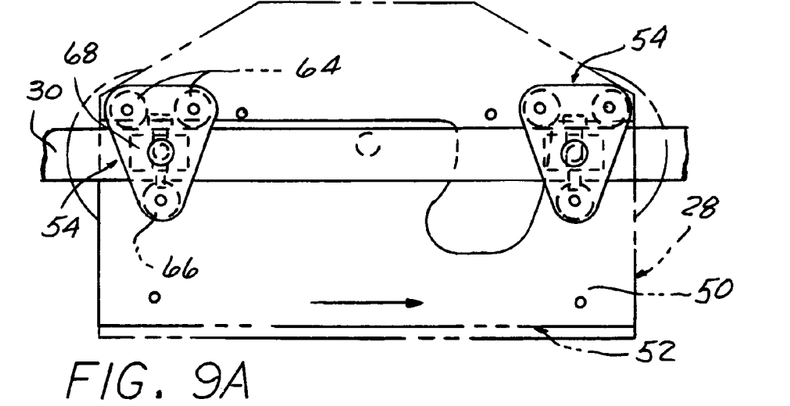
FIGS. 9A, 9B and 9C are plan views of a support-guide roller assembly and an associated pallet on a section of the guide track, negotiating a straight section, an outside curve, and an inside curve respectively.
Figure 9B:
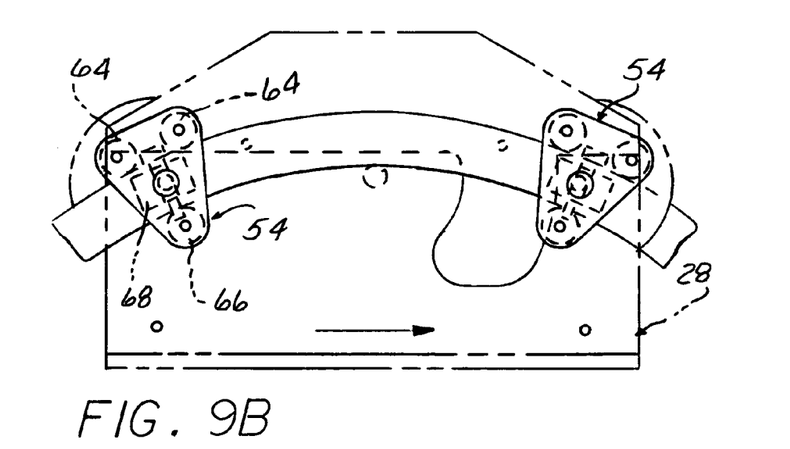
Figure 9C:
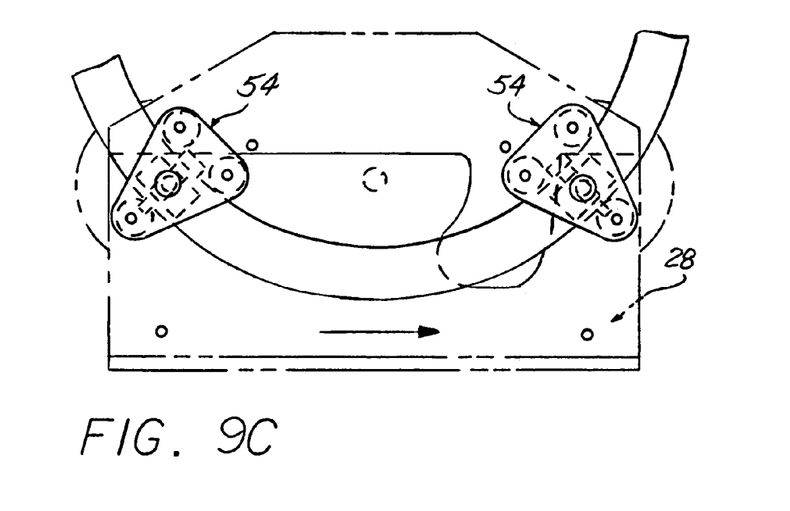

The roller 68 runs atop the track 30 while the rollers 64, 66 straddle the same, the pivotal mount of block 56 accommodating the changing curvature of the track 30 (FIGS. 9A–9C).

The track 30 is not trapped by the rollers 64, 66, 68 such that the pallets 28 can be lifted off the track 30 after removal of sprockets 98 engaged with drive chain 27 as described below.

A lower plate 31 attached to the vertical plate 52 projects horizontally inwardly, and mounts guide rollers 17 on the side edge of the support guide plate 16. The rollers 17 stabilize the pallet 28 in a vertical orientation as it moves along the track 30 while not interfering with removal of the pallet 28.

A chain engagement sprocket assembly 70 is also mounted to an intermediate horizontal plate 72 affixed to the pallet vertical plate 52 projecting horizontally and inwardly therefrom.

The chain engagement sprocket assembly 70 is mounted to the plate 72 by a swing bar 74 pivotally mounted at one end to the plate 72 by a shoulder screw 76 received in a threaded hole 84 in the swing bar 74, a bushing 78, thrust washers 82, and a thrust bearing 82.

A cut out 86 in the plate 72 provides a clearance which allows the sprocket assembly 70 to be swung in past the outer edge of the plate 72.

Figure 8A:
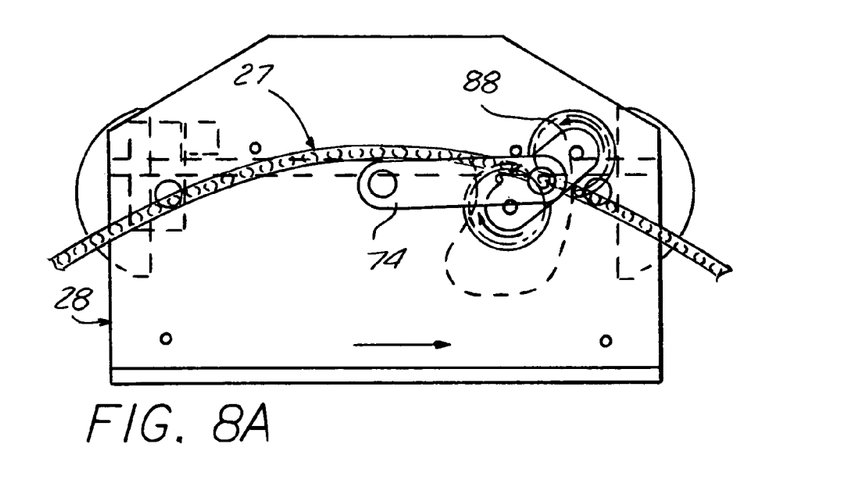
FIGS. 8A, 8B and 8C are plan views of the swing bar-sprocket assembly and a portion of an engaged drive chain negotiating an inside turn, straight section and outside turn respectively.
Figure 8B:
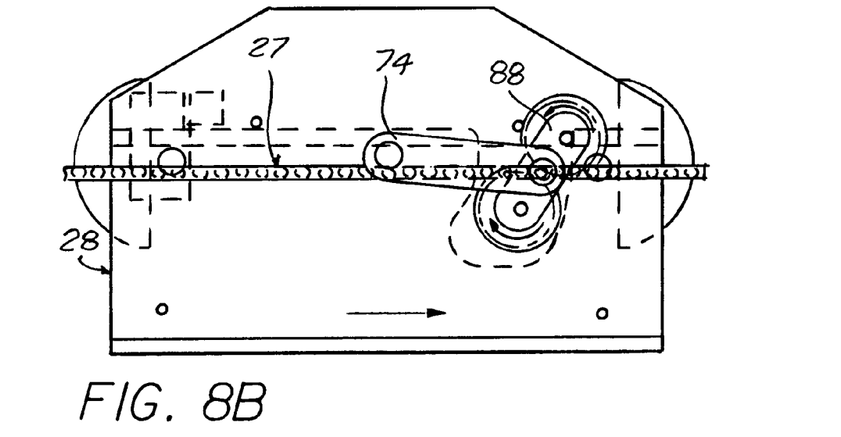
Figure 8C:
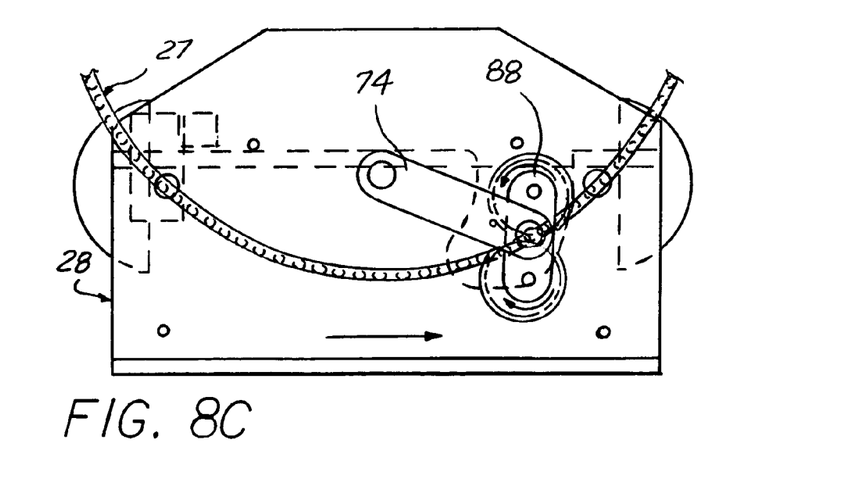

The sprocket assembly 70 is thus able to swing in and out as the pallet 28 changes its orientation with respect to the track 30 and chain 27 as it traverses outwardly curved, straight and inwardly curved conveyor sections as seen in FIGS. 8A, 8B, 8C.

This allows an accommodation to both inside and outside turns.

The sprocket assembly 70 further includes a sprocket bar 88 (FIGS. 6A, 6B) rotatably mounted on the swing bar 74 by a shoulder screw 90, a pair of thrust washers 92, a flange bushing 94, and a sleeve bushing 96. A pair of sprockets 98 are rotatably mounted side-by-side but spaced apart slightly on the pivoted sprocket bar 88 by a pair of shoulder screws 100 received in threaded holes in the sprocket bar 88, and bearings 102.

Figures 6A, 6B:
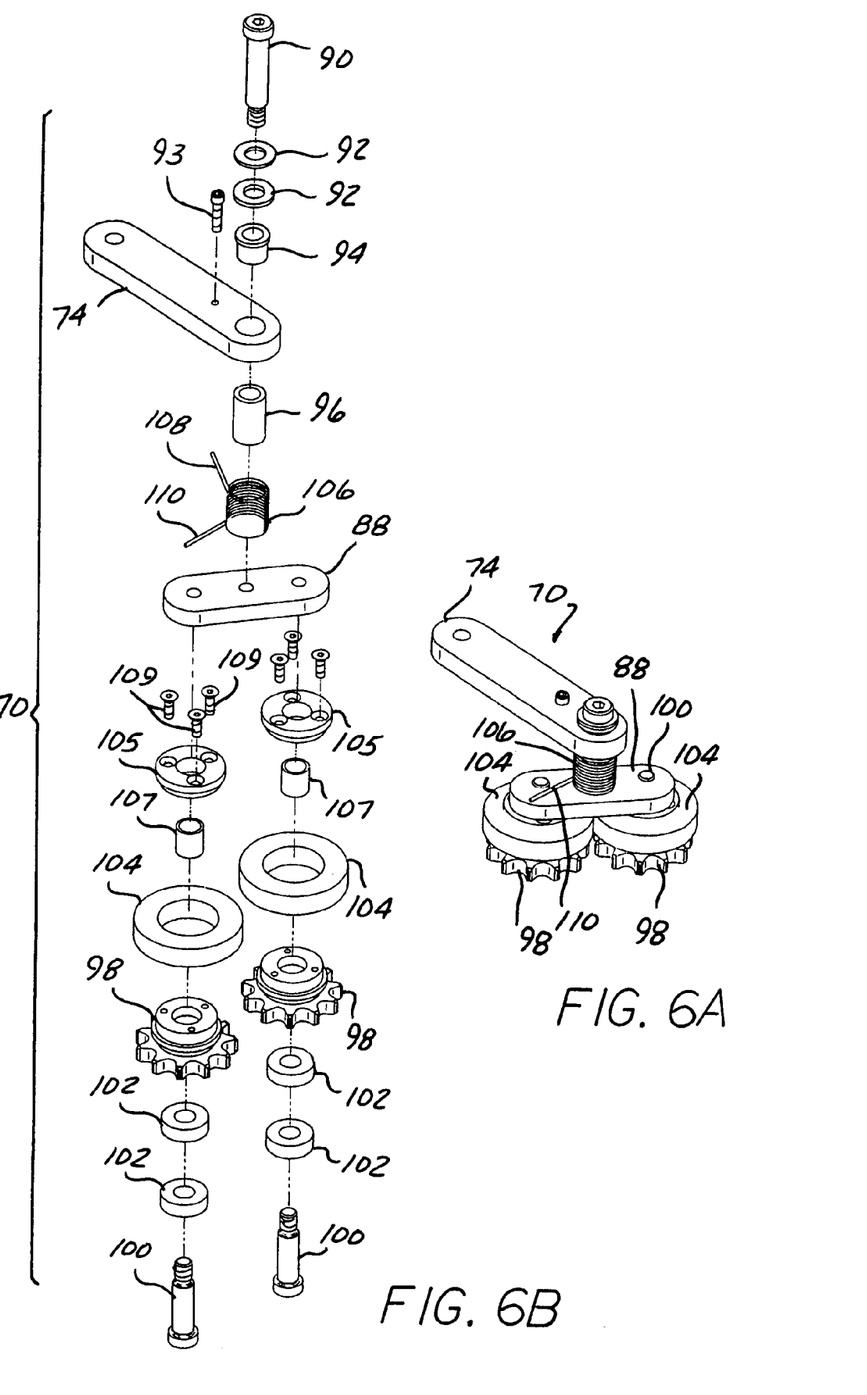
FIG. 6A is a pictorial of a swing bar-sprocket assembly used to establish a driving connection between the drive chain and pallet.
FIG. 6B is an exploded perspective view of the components of the swing bar-sprocket assembly shown in FIG. 6A.

Fixedly mounted to each sprocket 98 is a friction brake roller 104 made of urethane plastic, or other suitable material able to allow slippage. A cap 105 and spacer 107 are used to attach each roller to a respective sprocket 98. Sets of screws 109 attach the caps 105 to a respective sprocket 98, which clamps each roller 104 to a respective sprocket 98.

The urethane plastic friction roller 104 are sized and spaced to be in firm frictional engagement with each other with sufficient pressure to normally act as a brake on the sprockets 98 such that rotation of the sprockets 98 is prevented. This is because the rollers 104 engaged with opposite sides of the drive chain 27 tend to rotate in opposite directions so as to prevent each other from rotating.

Figure 7A:
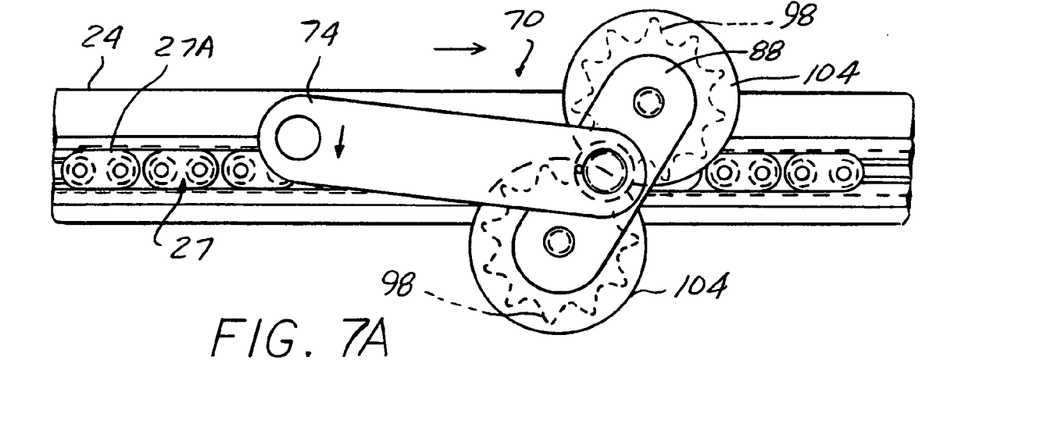
FIG. 7A is an enlarged plan view of a swing bar-sprocket assembly and a fragmentary portion of a driven chain engaged thereby and a guide channel in which the drive chain is guided.
Figure 7B:
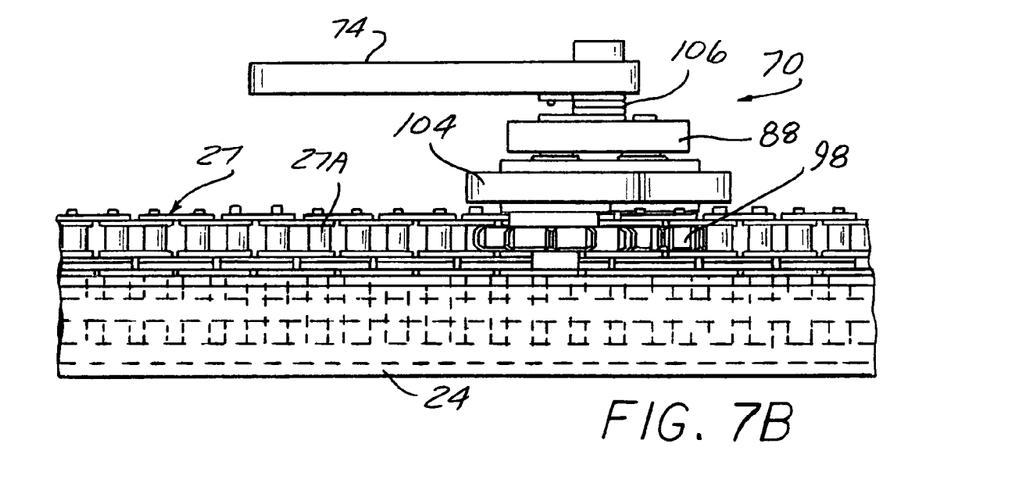
FIG. 7B is an elevational view of the components shown in FIG. 7A.
Figure 7C:
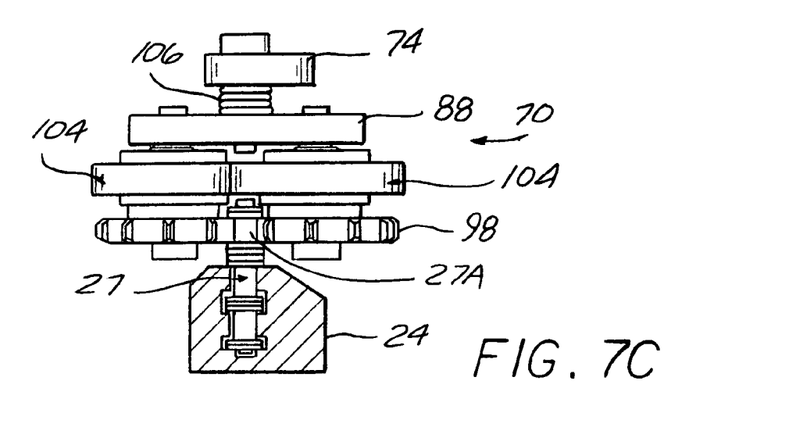
FIG. 7C is a view of a transverse section taken through the drive chain and guide channel.

The sprockets 98 straddle the drive chain 27, the teeth of each engaged with one side of the upper strand 27A of the drive chain 27 protruding above the guide channels 24 (FIG. 7B).

A wind up spring 106 is received over the bushing 96, with opposite legs 108, 110 respectively restrained by the protruding ends of a screw 93 and shoulder screw 100.

Thus, the sprocket bar 88 is resiliently held in an angled orientation on the swing bar 74 (FIG. 7A).

The coil spring 106 urges the sprocket teeth into engagement with the chain strand 27A by angling of the sprocket bar 88 as best seen in FIG. 7A.

This straddling, opposed engagement of the two sprockets 98 with the drive chain 27 eliminates any side thrust reaction force on the pallet 28 simplifying the support necessary therefor. More importantly, the tangent engagement of the two sprockets 98 with the drive chain 22 allows the pallets 28 to negotiate inside and outside turns while remaining engaged with the drive chain 22. The spring turning force exerted by the spring 106 insures that the sprocket teeth remain fully engaged with the drive chain 27 as turns are negotiated.

Since the sprockets 98 will not rotate in the absence of a predetermined torque being exerted thereon sufficient to overcome the frictional engagement of the opposing brake rollers 104, the engaged sprocket teeth are pulled along by the chain 27, carrying the pallet 28 along the track 30. This predetermined torque should be set in accordance with the load necessary during start up to insure movement of the pallets and the parts mounted thereon and any other moving components without relative slippage of the rollers 104.

As the inside and outside turns are traversed, both the swing bar 74 and sprocket bar 88 pivot to accommodate the changing geometry between the various components while maintaining a driving connection between the pallets 28 and the drive chain 27.

In order to accumulate the pallets 28 at a particular location, a fixed pallet stop mechanism 44 may be activated by the conveyor controls to extend a stop finger 116 into the path of a stop block 118 mounted on plate 72 by an extension plate 120.

This engagement of the stop block 118 positively acts to prevent the pallet 28 from moving with the drive chain 27, the perimeter of the friction rollers 104 then slipping against each other to allow the drive chain 27 to continue to circulate while the pallet 28 is stopped.

The next following pallet 28 contacts the bumper 48 of the stopped pallet 28 to also have its advance arrested, and so on, which accumulation is maintained until the stop cylinder 44 is operated to retract the stop finger 116 out of the path of the stop block 118.

Accumulation may be established at any point, although in some cases accumulation at inside turns may not be practical due to potential interferences depending on the radius of curvature of the turn, the pallet width, the part size, etc.

In such instances, a sensor (not shown) and additional stop cylinder 44 may be provided to prevent the entry of two pallets into an inside turn at one time by stopping the trailing pallet until the leading pallet moves out of the turn.

Figure 10:
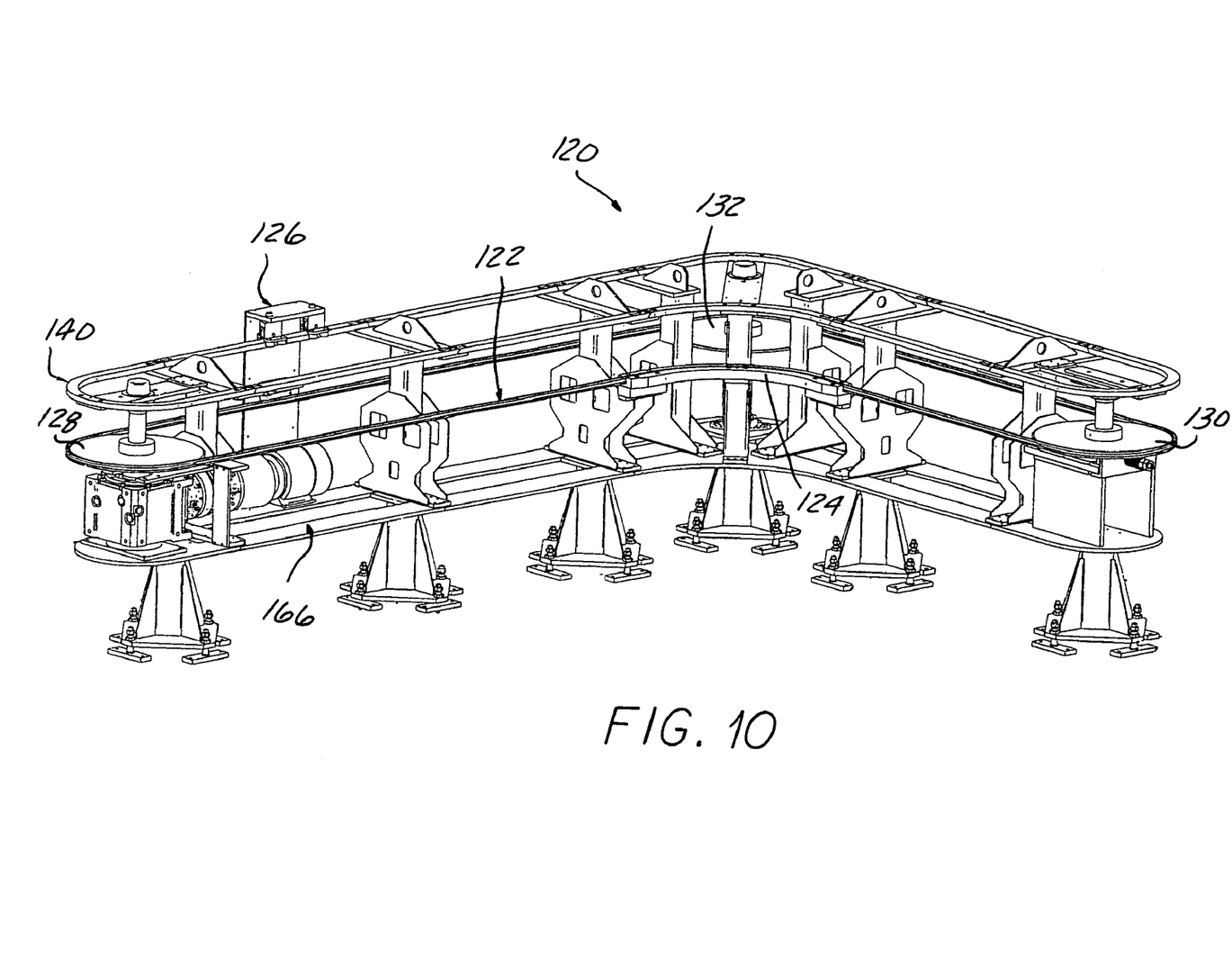
FIG. 10 is a pictorial view of another embodiment of a conveyor according to the present invention of the synchronous type, with only a single pallet installed for the sake of clarity.

FIG. 10 shows a synchronous or non accumulating conveyor 120 routed so as to have angularly related sections and utilizing some of the features of a conveyor according to the invention allowing inside turns.

Here, a single strand drive chain 122 is powered to circulated around a horizontal plane, along a path having outside turns at the ends, an intermediate outside turn, an inside turn across from the intermediate outside turn and straight segments.

An inside turn guide channel 124 is provided, but a full complement of pallets 126, only one shown in FIG. 10 for the sake of clarity, are used to support the drive chain 122 rather than additional guide channels. A powered drive sprocket 128, a tensioner idler sprocket 130 and an outside guide sprocket 132 are provided for support at the other turns, as in the above described conveyor.

Figures 11A, 11B:
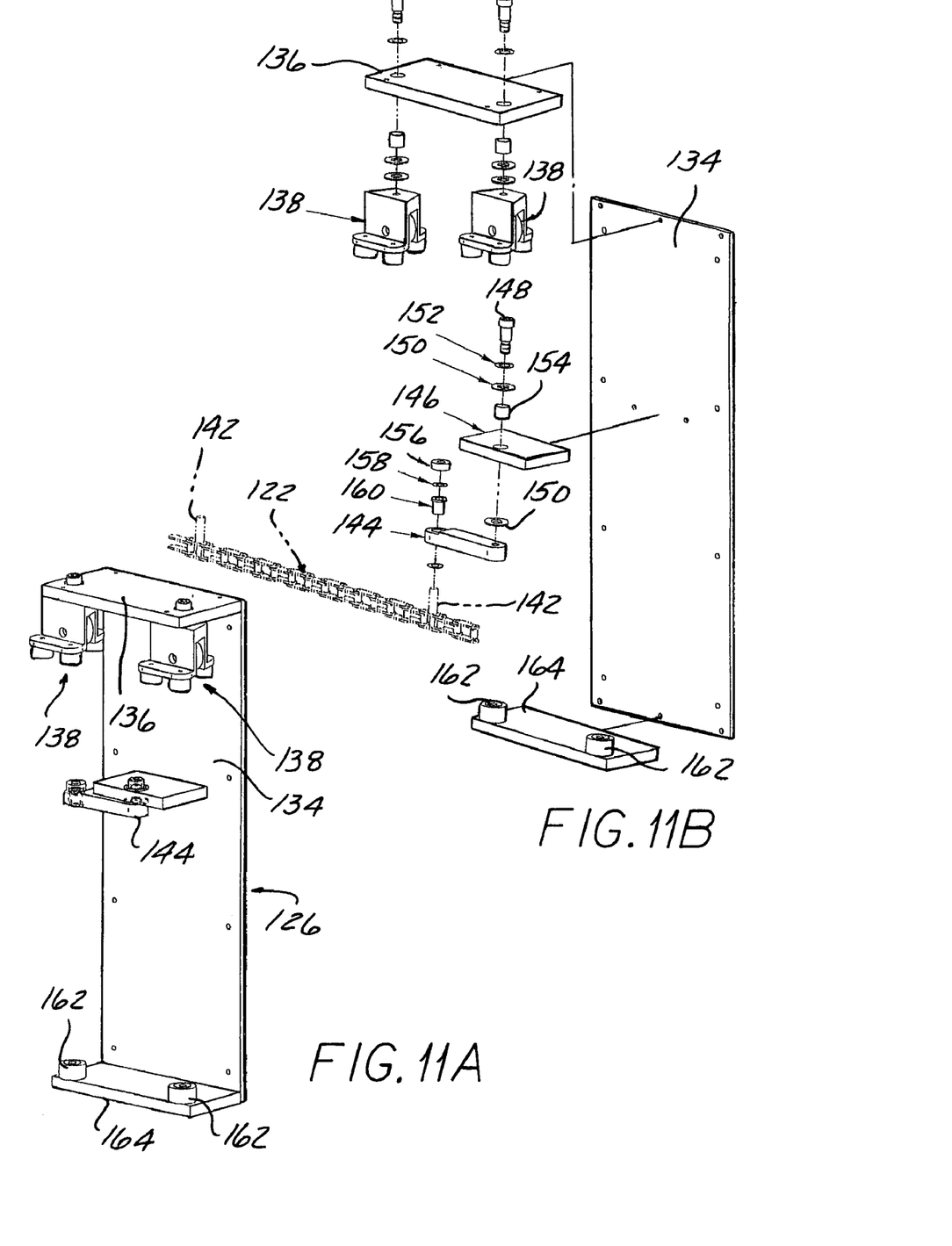
FIG. 11A is a pictorial view of a pallet included in the conveyor shown in FIG. 10, with a segment of a connected drive chain.
FIG. 11B is a pictorial exploded view of the components in the pallet shown in FIG. 11A.

As seen in FIGS. 11A, 11B, the pallets 126 are configured with a vertical side plate 134 and an attached horizontal to plate 136, each available for carrying parts in different orientations for a given application. Pivoted roller assemblies 138 are provided in the same manner as in the first described conveyor, supporting and guiding the pallets 126 as before on a track 140.

In this embodiment, the drive chain 122 is connected to each pallet 126 by means of a one of a series of equally spaced apart upright pins 142 fixed to the drive chain 122.

A swing bar 144 is pivotally mounted at one end to a middle plate 146 affixed to the side plate 34.

A shoulder screw 148 passing through a hole in the middle plate 146 is threaded into a hole at one end of the swing bar 144 to be anchored therein. Thrust washers 150, bearing washer 152, and bushing 154 provide a rotational support allowing pivoting of the swing bar 144 about the shoulder screw 148.

The other end of the swing bar 144 has a hole receiving the pin 142, with a clamp collar 156 holding the pin 142, and a thrust bearing washer 158 and bushing 160 providing rotational support.

A pair of guide rollers 162 are mounted on a bottom plate 164, which run along the outer edge of a guide plate 166 as in the first described embodiment.

The swing bar 144 swings in and out as the pallet traverses along the track 140 and around inside and outside turns to accommodate the changing angular relationship between the drive chain 122 and the pallet 126 in negotiating these turns.

The invention claimed is:

1. A conveyor comprising:
   a frame supporting a track extending along a closed loop path lying in a horizontal plane, said track having both inside and outside turns;
   a series of pallets supported and guided on said track to be able to roll along said track;
   a link drive chain extending in a closed loop along said track path, said drive chain passing around a sprocket at each end of said path to change direction, said drive chain being powered by one of said sprockets to be recirculated along said track path;
   said track path including at least one intermediate outside turn and an inside turn located across from each other along said track path;
   each of said pallets drivingly connected to said drive chain by a swing bar pivotally connected at one end to a portion of said pallet, and pivotally connected at an opposite end to said drive chain;
   whereby said pallets are thereby advanced along said track path and able to accommodate a changing orientation of each of said pallets in negotiating said inside and outside turns along said track path.

2. The conveyor according to claim 1 wherein each of said pallets include a pair of laterally spaced roller assemblies pivoted on a horizontal portion of said pallets for rotation about a vertical axis.

3. The conveyor according to claim 2 wherein each roller assembly includes a support roller riding on said track supported for rotation about a horizontal axis, and a plurality of guide rollers supported for rotation about a vertical axis, engaging opposite edges of said track to be guided thereby.

4. The conveyor according to claim 3 wherein said guide rollers comprise two guide rollers on inside edge of said track and one side roller on the opposite edge of said track.

5. The conveyor according to claim 1 wherein each of said swing bars connected to said pallets is drivingly engaged with said drive chain by a pair of sprockets carried on said other end of said swing bar, said sprockets spaced apart and straddling said drive chain while having sprocket teeth engaged therewith.

6. The conveyor according to claim 5 wherein said pairs of sprockets are both pivotally mounted on a sprocket bar pivotally mounted on said swing bar at an intermediate point to enable angling of said sprocket bar about a vertical axis to cause teeth of a respective sprocket to be engaged with a respective side of said drive chain.

7. The conveyor according to claim 6 wherein a spring is provided urging said sprocket bar to turn about said pivotal mounting and thereby urge said sprocket teeth of a respective sprocket into engagement with a respective side of said drive chain.

8. The conveyor according to claim 1 wherein said link drive chain has three strands and wherein said drive chain is guided and supported along straight and inside turn section of said track path by guide channels enclosing two of said chain strands with one strand protruding above said guide channel and drivingly connected to said swing bar other end by engagement therewith of said sprocket teeth.

9. The conveyor according to claim 1 wherein said conveyor further includes a guide plate disposed below said track and drive chain, having an outer edge extending along said path of said track but at a lower level, said pallets each having a roller engaged with said outer edge to stabilize said pallet orientation.

10. The conveyor according to claim 1 wherein said track closed loop path includes angled segments and includes an advance and return run extending between said ends of said conveyor substantially closely spaced and parallel to each other whereby no substantial floor space is wasted between said conveyor runs.

11. The conveyor according to claim 10 wherein a plurality of inside turns and a plurality of outside track turns are formed between said ends of said conveyor.

12. A method of connecting a series of pallets guided around a closed loop track lying in a horizontal plane having straight sections, inside turn sections and outside turn sections to a drive chain circulated around said track to move said pallets along said track, in a horizontal plane comprising:
   mounting one end of a respective horizontal swing bar to each pallet to be rotatable thereon;
   drivingly connecting the other end of each swing bar to said drive chain to be freely pivotable with respect to said chain at respective spaced locations along said drive chain.

13. The method according to claim 12 wherein said other end of each of said swing bars is connected to said drive chain by mounting a pair of sprockets on each of said swing bars arranged to straddle said chain with sprocket teeth thereon engaged with openings in said chain from a respective side, thereof.

14. The method according to claim 13 wherein mounting of said pair of sprockets on a respective swing bar is carried out by rotatably mounting each pair of sprockets on a respective sprocket bar and in turn rotating said sprocket bar on said other end of an associated swing bar so as to bring the teeth of each sprocket into engagement from a respective side of said drive chain.

15. The method according to claim 14 wherein said sprockets are rotated into engagement with said drive chain by installing a respective spring engaging as a sprocket bar urging a respective sprocket bar to rotate.

16. The method according to claim 12 wherein said other end of each swing bar is drivingly connected to said drive chain by a respective one of a series of spaced apart pins projecting vertically from said chain and received in said swing bar other end so as to allow pivoting therein.

17. A conveyor comprising:
   a frame supporting a track extending along a closed loop path lying in a horizontal plane, a series of track turns formed along said track path;
   a series of pallets supported and guided on said track to be able to roll along said track;
   a link drive chain extending in a closed loop along said track path, said drive chain passing around a sprocket at each end of said path to change direction, said drive chain being powered by one of said sprockets to be recirculated along said path;
   each of said pallets drivingly connected to said drive chain by a swing bar pivotally connected at one end to a portion of said pallet, said swing bar having an opposite end drivingly engaged with said drive chain;
   whereby said pallets are thereby advanced along said track path and able to accommodate a changing orientation of each of said pallets in negotiating said turns along said track path.

18. The conveyor according to claim 17 wherein each of said swing bars connected to said pallets is drivingly engaged with said drive chain by a pair of sprockets carried on said other end of said swing bar, said sprockets spaced apart and straddling said drive chain while having sprocket teeth engaged therewith.

19. The conveyor according to claim 18 wherein said pairs of sprockets are both pivotally mounted on a sprocket bar pivotally mounted on said swing bar at an intermediate point to enable angling of said sprocket bar about a vertical axis to cause teeth of a respective sprocket to be engaged with a respective side of said drive chain.

20. The conveyor according to claim 19 wherein a spring is provided urging said sprocket bar to turn about said pivotal mounting and thereby urge said sprocket teeth of a respective sprocket into engagement with a respective side of said drive chain.

21. A method of connecting a series of pallets guided around a closed loop track lying in a horizontal plane having straight sections and turn sections to a drive chain circulated around said track to move said pallets along said track, comprising:
   mounting one end of a respective horizontal swing bar to each pallet to be rotatable thereon;
   drivingly connecting the other end of each swing bar to said drive chain so as to be pivotable in a horizontal plane with respect to said chain at respective spaced locations along said drive chain.

22. The method according to claim 21 wherein said other end of each of said swing bars is drivingly engaged with said drive chain by mounting a pair of sprockets on each of said swing bars arranged to straddle said chain with sprocket teeth engaged with openings in said chain from a respective side, thereof.

23. The method according to claim 22 wherein mounting of said respective pair of sprockets on a respective swing bar is carried out by rotatably mounting each pair of sprockets on a respective sprocket bar and in turn rotating said sprocket bar on said other end of an associated swing bar so as to bring the teeth of each sprocket into engagement with said drive chain from a respective side of said drive chain.

24. The method according to claim 23 wherein said sprockets are rotated into engagement with said drive chain by installing a respective spring engaging each sprocket bar urging a respective sprocket bar to rotate so as to tend to cause said engagement.

25. The method according to claim 21 wherein said other end of each swing bar is drivingly connected to said drive chain by a respective one of a series of spaced apart pins projecting vertically from said chain and received in said swing bar other end so as to allow said pivoting with respect to said chain.

* * * * *